R. SAUNDERS.
ROTARY ENGINE.
APPLICATION FILED MAR. 3, 1917.
1,279,450.
Patented Sept. 17, 1918.
3 SHEETS—SHEET 1.
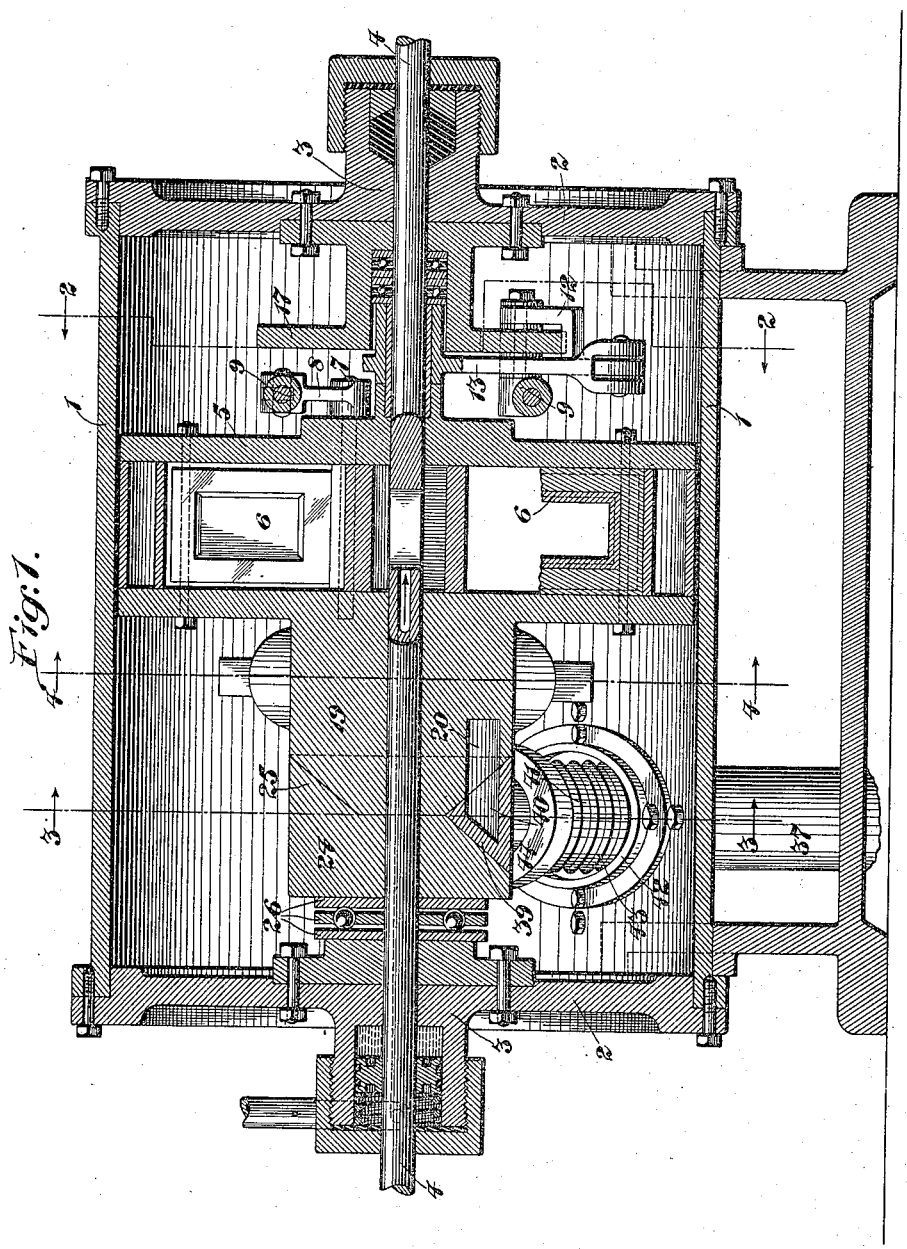

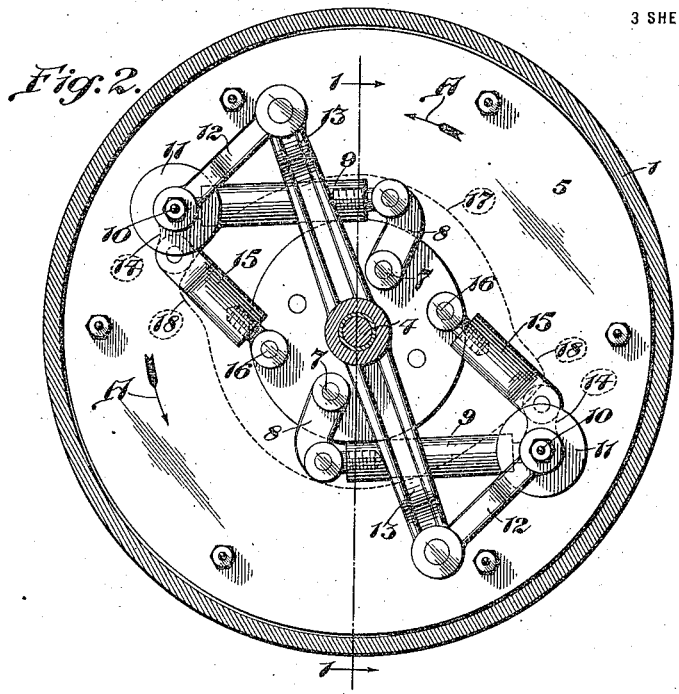
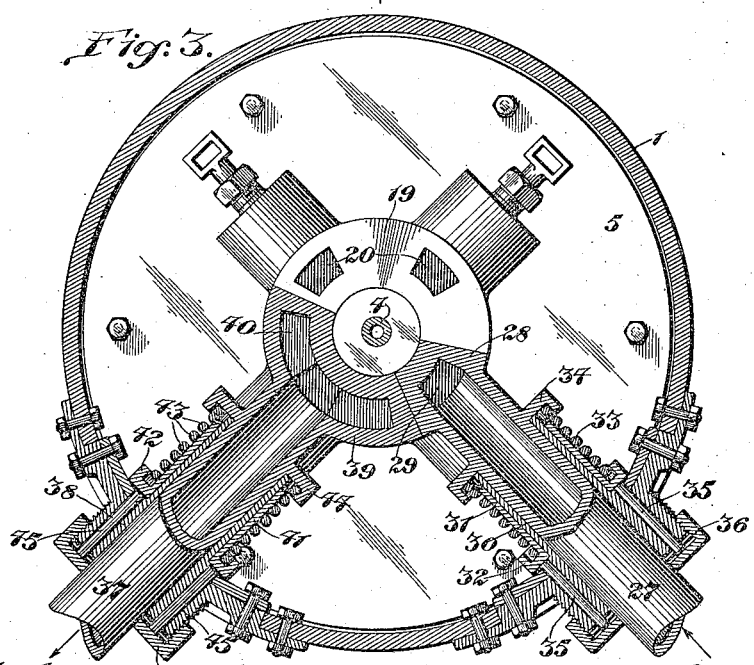

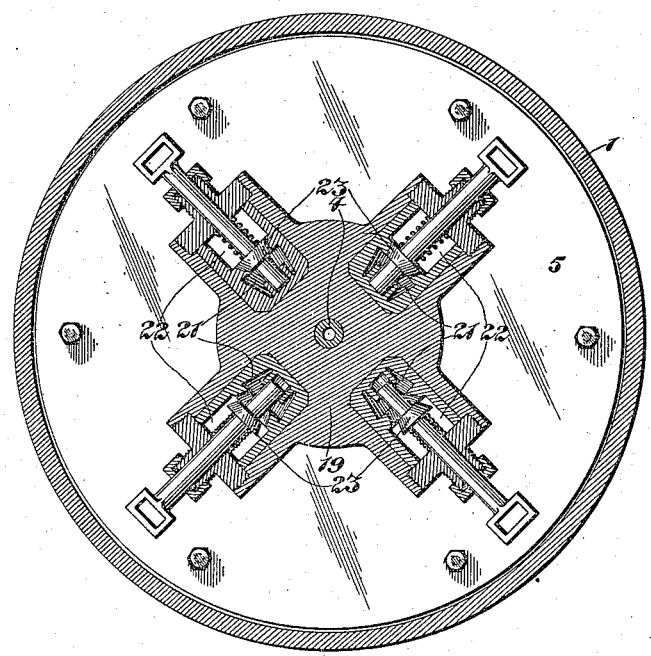

UNITED STATES PATENT OFFICE.

ROY SAUNDERS, OF ST. LOUIS, MISSOURI, ASSIGNOR TO SAUNDERS MOTOR POWER COMPANY, OF EAST ST. LOUIS, ILLINOIS, A CORPORATION OF ILLINOIS.

ROTARY ENGINE.

1,279,450.  Specification of Letters Patent.  Patented Sept. 17, 1918.

Application filed March 3, 1917. Serial No. 152,236.

*To all whom it may concern:*

Be it known that I, ROY SAUNDERS, a citizen of the United States, residing at the city of St. Louis and State of Missouri, have invented a new and useful Rotary Engine, of which the following is a specification.

This invention relates to rotary engines.

The object of the invention is to provide an improved and efficient intake and exhaust valve mechanism for rotary engines.

A specific object of the invention is to provide a novel and efficient mechanism for controlling the intake and exhaust in rotary engines of the type constituting the subject-matter of my prior application Serial No. 101,447 filed June 3, 1916, although it will be understood that the present invention may be adapted to and embodied in rotary engines of different construction from that shown in said application. Therefore, although, I have illustrated and described my present invention embodied in a rotary engine of the type illustrated in said application, it will be understood that by so doing I am in no sense limiting my claim of invention to the embodiment of the present subject-matter in any specific type of rotary engine.

In the accompanying drawings, illustrating the invention,

Fig. 1 is a longitudinal sectional view of a rotary engine of the general type illustrated in my said application Serial No. 101,447, having the present invention embodied therein for controlling the intake and exhaust of the engine.

Fig. 2 is a cross sectional view on the line 2—2 of Fig. 1 illustrating the connections for controlling and operating the pistons of the engine to and from positions of compression.

Fig. 3 is a sectional view on the line 3—3 of Fig. 1, showing the intake and the exhaust passages and the construction of the valve devices controlling them.

Fig. 4 is a sectional view on the line 4—4 of Fig. 1, illustrating valves mounted in the inlet and exhaust passages.

Fig. 5 is a sectional view illustrating the connection between the inlet pipe and the passage for receiving and conducting the gas from the inlet pipe to the rotor.

The engine embodied in which, for purposes of convenience, I have illustrated my present invention comprises a cylinder 1 and heads 2 attached to the cylinder provided with bearings 3 for the shaft 4 which is driven by the rotor. The rotor 5 is attached to the shaft 4 and is provided with a series of chambers in which the pivoted pistons 6 are mounted and which are moved to and from positions of compression on opposite sides of radial lines from the shaft 4 passing through the axes of the pistons, respectively. The axes of two of the pistons are indicated by the reference numeral 7 in Fig. 2. The mechanism for actuating the pistons, as aforesaid, includes levers 8 attached to the axes of the pistons, respectively; links 9 connecting the levers 8 with axial bolts 10 of the rollers 11; links 12 connecting the bolts 10 with the ends of a lever 13 pivoted upon the shaft 4; arms 14 on the bolts 10 connected by links 15 with pivoted members 16 supported by a boss on the end wall of the rotor; and a cam 17 attached to the head of the cylinder upon which the rollers 11 operate.

For convenience, I have illustrated only the mechanism for operating two of the pistons and the mechanism so illustrated is mounted within the cylinder at one end of the rotor, while the mechanism for operating the remaining two pistons is mounted within the cylinder at the opposite end of the rotor, as in the case of my said application Serial No. 101,447. For the purpose of the present description, it is deemed sufficient to illustrate and describe one of the mechanisms for operating the pistons since the specific construction of the piston operating mechanism is not claimed herein. The piston operating mechanism operates as follows:

As the rotor revolves in the direction of the arrows A in Fig. 2, the rollers 11 ride upon the periphery of the cam 17. As the rollers pass over the shoulders 18 of the cams the piston axes 7 that are connected with the respective rollers will be controlled for a quarter of a revolution of the roller, so that during the interval that the rollers 11 are passing down the sharp faces of the shoulders 18, the forward ends of the links 15 are moved relative to the rear ends of the links 9. When the links 15 have been thus moved forwardly to the full extent of their movement, the rollers will be drawn forwardly over the curved surfaces of the cams, extending from the base of the respective shoulders 18 to the high points of said shoulders. This movement gradually rocks the respective pistons to the opposite sides of the chambers in which they are mounted. That is to say, assuming one of the pistons to be in position of compression, explosion then occurs, and while the piston is thus controlled by the link connections and by the rollers 11 operating on the cam shoulder, the rotor is driven forwardly by the pressure on the pistons acting through the links and rollers on the cams 17 as stationary resistance members; as each roller 11 travels from the shoulder at which the explosion occurred and approaches the apex of the other shoulder, the piston is moved by the link connections and the roller operating on the cam to the same position relative to the rotor that it occupied when in position of compression, and this movement of the piston after explosion effects exhaust; intake of the gas and movement of the piston to position of compression occurs during movement of the roller on the cam toward the shoulder 18 at which explosion occurred as above described.

The foregoing operating mechanism and the mode of operation thereof is the same as that disclosed in my said application Serial No. 101,447, and the description thereof need not be further extended herein since it is sufficient for present purposes to understand the general mode of operation of the piston to effect intake and exhaust.

Referring next to the intake and exhaust mechanism, a part of which constitutes the subject-matter of the present invention, it will be observed by reference to Figs. 1 and 5 that one of the ends of the rotor is formed with an extended hub 19. The outer extremity of the hub 19 is in the form of a truncated cone. The hub is provided with a series of passages 20 therein opening into the valve chambers 21 which communicate with passages 22 through the end wall of the rotor, opening into the piston chambers, respectively. Each valve chamber 21 supports a valve 23 movable to and from its seat to close and to open the passage in order to permit intake of gas to the piston chamber and exhaust of the products of explosion therefrom. The mechanism for operating the valves 23 to open and closed position is not illustrated in the present drawings, as I do not desire to claim that mechanism herein. It is sufficient for present purposes to understand that the valves 23 are arranged to be operated in conformity with the operation of the rotor to permit intake and exhaust as the engine operates.

A member 24 is mounted on the shaft 4 so that the shaft rotates within said member. The member 24 is formed with a projecting part 25 fitting against the oblique end wall of the hub 19 and is pressed to position against the hub 19 by appropriate pressure-imparting elements 26 mounted between the member 24 and the head of the cylinder. Thus, as the rotor rotates, the passages 20 are alternately opened and closed by the member 24—25, said member acting as a species of valve to close the passages 20 when they are out of communication with the intake and exhaust passages of the engine.

The inlet passage is in the form of a pipe 27 having a head 28 at its inner end shaped to fit closely within a recess or space formed between the hub 19 and the member 24. The head 28 has a lateral outlet 29 which communicates with the passages 20 successively as the rotor revolves, so that the gas being forced through the pipe 27 is admitted to the piston chambers alternately, it being understood that the passage 29 is closed by the beveled wall of the hub 19 between the passages 20.

The pipe 27 is yieldingly held in position so that it may yield or move slightly to accommodate and adjust itself to maintain close connection with the coöperating parts under varying conditions and to compensate for any varying of the parts that might occur. For this purpose the pipe is mounted within a supporting sleeve 30, bolted to the cylinder and provided with an exteriorly threaded portion. The sleeve 30 is encircled by a relatively movable sleeve 31, the outer extremity of which is provided with a channel 32 serving as a seat for the outer end of a spring 33, the inner end of which abuts against a flange 34 on the pipe 27. Thus, the spring 33 actuates the pipe inwardly, holding it at all times with proper pressure against the valve seat to permit any variation or adjustment of the passage that may be required. The tension of the spring 33 may be varied to increase or reduce pressure with which the pipe is held against the valve seat. For this purpose there are a number of pins 35 mounted in holes in the sleeve member 30 and having their inner ends bearing against the spring seat 32 and their outer ends projecting beyond the end of the sleeve member 30. A cap nut 36 screws onto the threaded portion of the sleeve member 30 and engages the ends of the pins 35, so that by adjusting the cap member in different positions the tension of the springs may be varied.

The exhaust device is quite similar in construction and arrangement to the intake, and comprises a pipe 37 adjustably mounted in a sleeve member 38 and provided with a head 39 at its inner end matching and fitting between the oblique end wall of the hub 19, and the adjacent oblique wall of the member 24. The head 39 is formed with an elongated slot 40 which is of sufficient length to permit two of the passages 20 to register therewith at the same time, and which is in registration with each passage 20 for about one-fourth of each revolution of the rotor, in order to permit all of the exhaust to be forced out of the piston chambers as the pistons move in the direction to effect exhaust, as above described.

The head of the passage 37 is yieldingly retained in position by mechanism similar to that associated with the pipe 27, including a sleeve 41 having a spring seat 42 for the spring 43, the opposite end of which bears against a spring seat 44 on the pipe 37. Pins 45 are mounted in holes in the sleeve member 38 and have their inner ends bearing against the flange 42 and their outer ends extending beyond the end of the threaded portion of the sleeve 38 and pressed inwardly by a nut 46. By adjustment of the nut 46 in different positions the tension of the spring 43 may be varied to regulate the pressure by which the head 39 is held against its seat.

From the foregoing it will be understood that the essence of my present invention is in the construction, arrangement and mode of operation of the intake and exhaust passages, and the means by which they are controlled and caused to perform their functions.

Obviously, the specific construction may be varied without departing from the principle and scope of the invention.

What I claim and desire to secure by Letters Patent, is:—

1. In a rotary engine, a cylinder, a rotor mounted in the cylinder, a passage through one wall of the rotor for admitting gas thereto and exhausting the products of combustion therefrom, a valve carried by the rotor for controlling said passage, a pipe supported by the cylinder for admitting gas into said passage, a resilient device holding the pipe in position to admit gas into the passage, and a pipe supported by the cylinder and being alternately in and out of communication with said passage for receiving and conducting therefrom the products of combustion.

2. In a rotary engine, a cylinder, a rotor mounted in the cylinder, a passage through one wall of the rotor for admitting gas to the rotor and conducting products of combustion therefrom, a valve carried by the rotor for controlling said passage, a pipe supported independently of the rotor for admitting gas into said passage, an additional pipe supported independently of the rotor for receiving and conducting the products of combustion from said passage, said pipes being alternately in and out of communication with said passage as the rotor rotates, and a resilient device for each of said pipes holding the same in position to communicate alternately with said passage as the rotor revolves.

3. In a rotary engine, a cylinder, a rotor mounted in the cylinder and provided with piston chambers, passages through one wall of the rotor opening into said chambers respectively, a pipe supported by the cylinder, a seat against which said pipe is held as the rotor rotates, and a passage from said pipe alternately in and out of communication with the passages through the wall of the rotor for admitting gas thereto as the rotor rotates.

4. In a rotary engine, a cylinder, a rotor mounted in the cylinder and having piston chambers therein and including an end wall, passages through the end wall of the rotor opening into said chambers respectively, a pipe supported by the cylinder and bearing against a part of said end wall and having an opening communicating with said passages alternately as the rotor rotates, and resilient means holding said pipe in the position aforesaid.

5. In a rotary engine, a cylinder, a rotor mounted in the cylinder and having piston chambers therein and including an end wall, passages through the end wall of the rotor opening into said chambers respectively, a pipe supported by the cylinder and bearing against a part of said end wall and having an opening communicating with said passages alternately as the rotor rotates, resilient means holding said pipe in the position aforesaid, and means for varying the tension of said resilient means.

6. In a rotary engine, a cylinder, a rotor mounted in the cylinder and including an end wall, passages through said end wall for admitting gas into the rotor, valves supported by the rotor for controlling said passages, and an inlet pipe supported by the cylinder in position so that said passages are alternately brought into and out of communication therewith.

7. In a rotary engine, a cylinder, a rotor mounted in the cylinder and including an end wall, passages through said end wall for admitting gas into the rotor, valves supported by the rotor for controlling said passages, an inlet pipe supported by the cylinder in position so that said passages are alternately brought into and out of communication therewith, and means retaining said pipe in the position aforesaid and permitting yielding movement of said pipe.

8. In a rotary engine, a cylinder, a rotor in the cylinder including piston chambers and having an end wall, passages through the end wall of the rotor communicating with said chambers respectively for admitting gas into and exhausting the products of explosion from the chambers of the rotor, valves supported by the rotor for controlling said passages, an inlet pipe supported by the cylinder in position so that said passages are alternately moved into and out of communication therewith as the rotor rotates, and an exhaust pipe also supported by the cylinder in position so that the passages through the rotor wall are moved into communication therewith prior to communicating with the inlet pipe.

9. In a rotary engine, a rotor, an end wall on the rotor, a hub in connection with the end wall having a beveled peripheral surface at its end, passages through said hub and through said end wall for admitting gas into and exhausting the explosive products from the rotor, valves carried by the hub for controlling said passages, an inlet pipe supported by the cylinder for admitting gas into said passages alternately, and an additional pipe supported by the cylinder for receiving the explosive products from said passages successively.

10. In a rotary engine, a cylinder, a rotor in the cylinder including an end wall, a hub in connection with the end wall having a peripheral beveled surface at its end, passages through said end wall and through said hub opening from said beveled surface, valves carried by the hub for controlling said passages, an inlet pipe bearing against said beveled surface for admitting gas into said passages successively, an exhaust pipe supported by the cylinder and bearing against said beveled surface for receiving the explosive products from said passages successively, and means for varying the pressure with which said pipes bear against said beveled surface.

11. In a rotary engine, a cylinder, a rotor in the cylinder including an end wall, a hub in connection with the end wall, passages through said end wall and through said hub for admitting gas into and exhausting the explosive products from the rotor, valves carried by the hub for controlling said passages, an inlet pipe supported by the cylinder bearing against the hub for admitting gas into said passages successively, an exhaust pipe supported by the cylinder bearing against the hub for receiving the explosive products from said passages successively, and a device closing said passages during their movement from the inlet pipe to the exhaust pipe.

12. In a rotary engine, a cylinder, a rotor in the cylinder including an end wall, a hub in connection with the end wall, passages through said end wall and through said hub for admitting gas into and exhausting the explosive products from the rotor, valves carried by the hub for controlling said passages, an inlet pipe supported by the cylinder bearing against the hub for admitting gas into said passages successively, an exhaust pipe supported by the cylinder bearing against the hub for receiving the explosive products from said passages successively, resilient devices for holding said pipes yieldingly against the hub, and a device closing said passages during their movement from the inlet pipe to the exhaust pipe.

13. In a rotary engine, a cylinder, a rotor in the cylinder including an end wall, a hub in connection with the end wall, passages through said end wall and through said hub for admitting gas into and exhausting the explosive products from the rotor, valves carried by the hub for controlling said passages, an inlet pipe supported by the cylinder bearing against the hub for admitting gas into said passages successively, an exhaust pipe supported by the cylinder bearing against the hub for receiving the explosive products from said passages successively, resilient devices for holding said pipes yieldingly against the hub, means for varying the tension of said resilient devices to vary the pressure of said pipes against the hub, and a device closing said passages during their movement from the inlet pipe to the exhaust pipe.

14. In a rotary engine, a cylinder, a rotor within the cylinder including an end wall, a hub in connection with the end wall, a shaft journaled in the cylinder and driven by the rotor and extending through said hub, passages through said end wall and through said hub, valves supported by the hub for controlling said passages, an inlet pipe supported by the cylinder bearing against the hub for admitting gas into said passages successively, an exhaust pipe supported by the cylinder bearing against the hub for exhausting the explosive products from said passages successively, adjustable devices for pressing said pipes against said hub, a device supported by said shaft and relative to which the shaft revolves for closing said passages during their movement from the inlet pipe to the exhaust pipe as the rotor revolves, and means for holding said device in position to close said passages as aforesaid.

In witness whereof, I have signed this specification.

ROY SAUNDERS.

Copies of this patent may be obtained for five cents each, by addressing the "Commissioner of Patents, Washington, D. C."